(12) United States Patent
Horvitz

(10) Patent No.: US 9,159,091 B2
(45) Date of Patent: Oct. 13, 2015

(54) METHOD AND APPARATUS FOR PERSONALIZED CONTENT-SHARING AND GIFTING VIA A COMMUNICATION MEDIUM

(76) Inventor: Joey Horvitz, Los Angeles, CA (US)

( * ) Notice: Subject to any disclaimer, the term of this patent is extended or adjusted under 35 U.S.C. 154(b) by 0 days.

(21) Appl. No.: 12/368,262

(22) Filed: Feb. 9, 2009

(65) Prior Publication Data

US 2012/0123895 A1  May 17, 2012

Related U.S. Application Data

(60) Provisional application No. 61/027,398, filed on Feb. 8, 2008.

(51) Int. Cl.
| | | |
|---|---|---|
| *G06Q 30/00* | (2012.01) | |
| *G06F 17/30* | (2006.01) | |
| *G06Q 30/06* | (2012.01) | |

(52) U.S. Cl.
CPC ................................. *G06Q 30/0621* (2013.01)

(58) Field of Classification Search
CPC .................................................. G06Q 30/0621
USPC ............................................... 705/26.1–27.2
See application file for complete search history.

(56) References Cited

U.S. PATENT DOCUMENTS

| | | | | |
|---|---|---|---|---|
| 8,464,302 | B1* | 6/2013 | Liwerant et al. | 725/115 |
| 2002/0019776 | A1* | 2/2002 | Simpson | 705/22 |
| 2007/0256338 | A1* | 11/2007 | Bawarsky | 40/124.06 |
| 2008/0066102 | A1* | 3/2008 | Abraham et al. | 725/37 |
| 2008/0077872 | A1* | 3/2008 | Zeevi et al. | 715/762 |
| 2008/0216139 | A1* | 9/2008 | Liwerant et al. | 725/113 |
| 2008/0307475 | A1* | 12/2008 | Liwerant et al. | 725/109 |
| 2009/0012878 | A1* | 1/2009 | Tedesco et al. | 705/27 |
| 2009/0049490 | A1* | 2/2009 | White | 725/100 |
| 2009/0063297 | A1* | 3/2009 | Dooley et al. | 705/26 |
| 2009/0070258 | A1* | 3/2009 | Nguyen et al. | 705/41 |
| 2010/0223314 | A1* | 9/2010 | Gadel et al. | 709/200 |

OTHER PUBLICATIONS

Now showing on regards.com—. (Mar. 16, 2000). PR Newswire Retrieved from http://search.proquest.com/docview/449390609?accountid=14753.*

* cited by examiner

*Primary Examiner* — Kathleen Palavecino
(74) *Attorney, Agent, or Firm* — Alexander Chen, Esq.

(57) ABSTRACT

The present disclosure describes one or more apparatuses and methods to allow users to generate a greeting card by defining a theme, a personalized message, content, and optionally a gift.

2 Claims, 4 Drawing Sheets

METHOD AND APPARATUS FOR PERSONALIZED CONTENT-SHARING AND GIFTING VIA A COMMUNICATION MEDIUM

CROSS REFERENCE TO RELATED APPLICATION

This application claims the benefit of U.S. Provisional Patent Application No. 61/027,398, filed Feb. 8, 2008 and entitled "METHOD AND APPARATUS FOR PERSONALIZED CONTENT-SHARING AND GIFTING VIA A COMMUNICATION MEDIUM," the entire contents of which are incorporated herein by reference.

FIELD OF THE INVENTION

This disclosure relates to the field of computer technology. More specifically, the disclosure relates to a method and apparatus for personalized content-sharing and distribution using a greeting card, for providing users with an ability to attach an electronic gift card to a purchase, and/or to attach a gift, whether digital or physical, to a card, and for using a greeting card to make content and e-commerce entities available to a user.

BACKGROUND

The world of the Internet is changing rapidly. Users have become increasingly comfortable with making a significant percentage of their purchases online. Everything from automobiles to groceries can now be easily purchased over the Internet, and users have responded to this broad availability by making more frequent online purchases. According to Netpop Research, consumers cite convenience, efficiency, time Management, better prices, broader selection, price comparisons and the ability to avoid crowds as primary motivations for shopping online. Consumers are able to use websites such as Shopzilla, Shopping.com and NexTag to compare product prices and ensure they find the best possible deal.

As part of this growing consumer confidence, spending on digital retail will see tremendous growth in the coming years. It is estimated that in 2007 consumer digital spending will total $300 million. In 2008, the number will double to $600 million. Research firm Screen Digest recently forecast that by 2011, digital downloads will generate $1.3 billion in annual revenue. As this kind of spending gains mainstream acceptance, consumers will increasingly purchase digital files of music, books, photos and movies. While digital movie downloads generated a trifling $20 million in 2006, eMarketer conservatively estimates that movie downloads will reach $846 million by 2011. Parks Associates projects revenue to be in the range of $1.8 billion.

In addition and over the past years, there has been a remarkable transformation in the kind of content available online. Video in both short form and long form is now readily available through multiple portals and platforms. Innovation and technological advances have provided Internet users with the proper connection speeds and power to make online video a reality, and have enabled users to share and distribute content within their own specific social networks in a manner they find unique and compelling.

SUMMARY OF THE INVENTION

Embodiments of the present disclosure address shortcomings in the prior art and provide a method and apparatus to allow a user to generate a greeting card having a theme and comprising a personalized message and content, and optionally a gift, all of which are independently selected by the user. In accordance with one or more embodiments, components of the greeting card allow a greeting card recipient to access e-commerce and content identified during generation of the greeting card.

In accordance with one or more embodiments, a greeting card generation apparatus comprises a greeting card generation engine configured to allow a user to generate a greeting card. The greeting card generation engine allows the user to identify a theme for the greeting card, include a personalized message, identify content that is to be a part of the greeting card, and optionally associate one or more gifts, or information associated with the one or more gifts, to the greeting card. By way of some non-limiting examples, associated information can be an advertisement, coupon, etc.

In yet other embodiments, a greeting card generation method comprises steps to make a user interface available to a user computing device, the user interface comprising at least one display that allows the user to identify a theme for a greeting card, include a personalized message for the greeting card, identify content that is to be a part of the greeting card, and to optionally associate one or more gifts, or information associated with the one or more gifts, to the greeting card.

Embodiments of the present disclosure allow users to generate a greeting card by defining a theme, a personalized message, content, and optionally a gift. By virtue of this arrangement, a greeting card can be used as a conduit for content sharing, which can be personalized and customized according to user preferences.

In accordance with one or more embodiments, a greeting card can include one or more advertisements that are relevant to the greeting card contents. By way of a non-limiting example, an advertisement can be included with a greeting card that is relevant to the content, theme, and/or gift portions of the greeting card.

In accordance with one or more embodiments, the content, gift and theme selections made in generating a greeting card are independently interchangeable, such that selection of one, e.g., a theme, need not impact or limit the selection of another, e.g., content and/or gift. In accordance with one or more embodiments, gift suggestions can be made available that are relevant to the content selected for the greeting card.

In accordance with one or more embodiments of the present disclosure, a greeting card site and/or greeting card system is provided, which fundamentally alters the way in which content and gifting elements of the Internet exist. By scouring the web, studios and networks for top notch content and premium gifting, acquiring them, and then fusing these multifarious elements side by side in one place at one time, by way of a greeting card, the way in which users interact with these once independent elements changes. The greeting card generation site and/or system can act as a conduit between online content and online retail and furthermore function in a bi-directional manner by constantly, or on a frequent basis, reminding the user of the origin of gifting and content elements used in their greeting cards and existing within the greeting card system.

Advantageously, embodiments of the present disclosure provide an ability to distribute and/or share content and to take advantage of content of whatever kind, e.g., audio, video, multimedia, etc., that may be accessible or available from a source, e.g., online, studio, or other content provider or source, or otherwise communicable via an electronic media.

DETAILED DESCRIPTION

Figure 1:
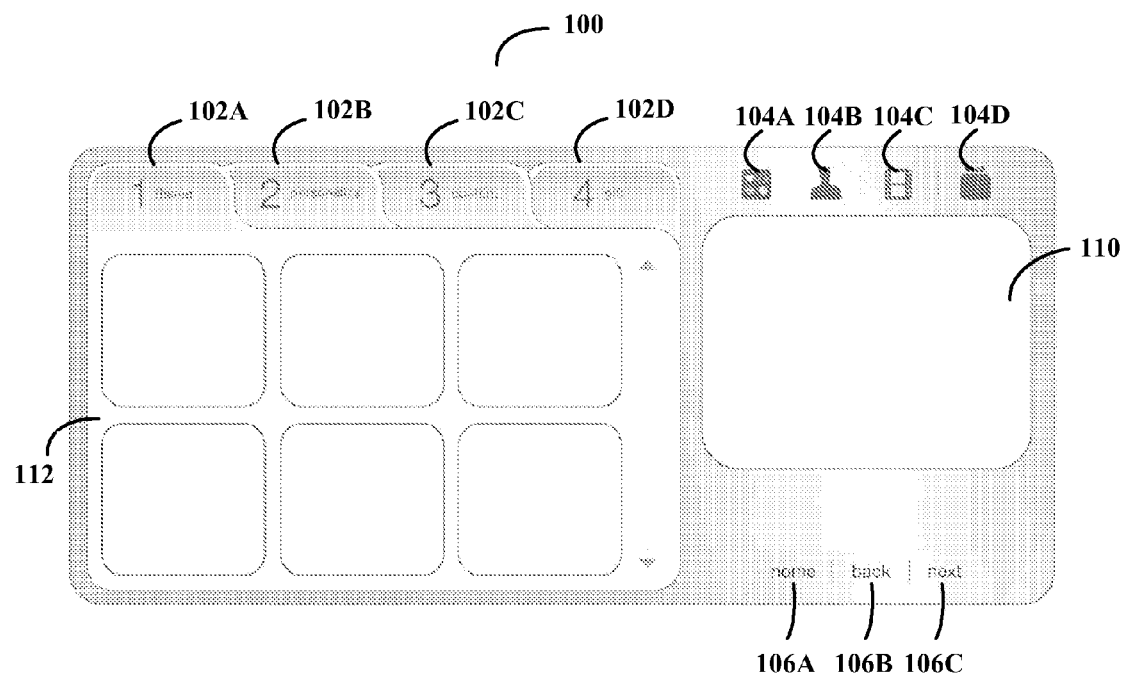
FIG. 1 provides an example of an interface that can be used to generate a greeting card in accordance with one or more embodiments of the present disclosure.

A method and apparatus for personalizing and customizing content sharing and gifting are provided. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

Furthermore, while embodiments of the present disclosure are disclosed with reference to a greeting card medium, it should be apparent that other forms of media are contemplated, including without limitation such media as a newsletter (e.g., advertisement, marketing, etc.), electronic mail message, instant message, electronic/interactive invitation and/or announcement, listing service posting (e.g., job, rental, real estate, personals, time shares, sale, services, etc. listing), press release, survey, petition, interactive gaming and storytelling (content), as well as other forms of communication or communiques.

In accordance with one or more embodiments, a greeting card generation system, which includes a greeting card generation engine, is provided, allows a user to generate a greeting card. The greeting card generation system allows the user to identify a theme for the greeting card, include a personalized message, identify content that is to be a part of the greeting card, and optionally attach one or more gifts to the greeting card. Examples of gifts, or gift types include, without limitation: charitable, coupons, digital downloads, gift cards, physical items, subscriptions, and the like.

In accordance with one or more embodiments of the present disclosure, content, gift and theme selections are independently interchangeable, such that selection of one of these components, e.g., a theme, need not impact or limit the selection of the another component, e.g., content and/or gift. In addition and in accordance with such embodiments, the user has the ability to change one of these components of the greeting card without impacting the other components.

Embodiments of the present disclosure facilitate greeting card generation by providing the user with predefined greeting card alternatives, which can be grouped or categorized. The user selects a category and is then presented with theme, gift and content selections corresponding to the user's category selection.

Embodiments provide a mechanism via the web that allows users/consumers to select from various content and gifting possibilities during greeting card generation, and to distribute the greeting card to any number of recipients. Examples of methods of distribution of a greeting card include, without limitation, via electronic mail, postal or other delivery service, instant messaging, satellite/cable/broadcast transmission. In the latter case, delivery can be made via a set top box, or other receiver/transmitter of audio and/or video, to a television, or other monitor, such that a recipient can interact with a greeting card using the recipient's television.

Figure 4:
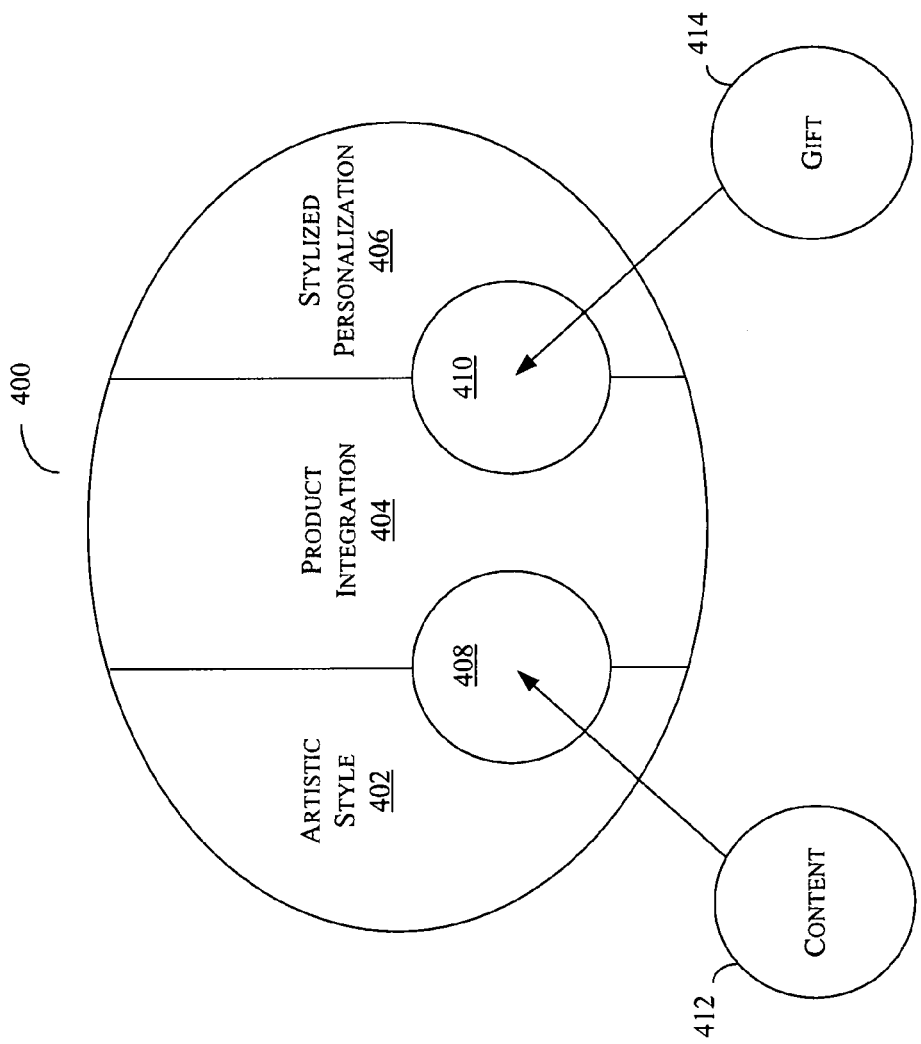
FIG. 4 provides a general overview of a theme component as a stylized container for content and gift components in accordance with one or more embodiments of the present disclosure FIG. 5 provides an example of a general-purpose computer environment for use in accordance with one or more embodiments of the present disclosure.

In accordance with one or more embodiments, the greeting card has a theme that provides a stylized container for the greeting card content and e-commerce components. FIG. 4 provides a general overview of a theme component as a stylized container for content and gift components in accordance with one or more embodiments of the present disclosure.

A theme 400 can function as a narrative vehicle that defines a progression of a greeting card presentation from its inception, e.g., a personalization selected by the sender, to its conclusion, e.g., gift revelation, as well as points in between.

The theme 400 can include, without limitation, an artistic style 402, product integration 404, and stylized personalization 406. Theme 400 acts as the "container" for the card and specifies a general look and feel of the greeting card. Theme 400 can define a style for the card. Examples of categories of themes include, without limitation, consumer goods, entertainment brands, title sequences and art styles. Embodiments of the present disclosure provide a vast selection of themes, content and gifts readily available for any occasion. In accordance with such embodiments, a theme 400, content 412 and gift 414 are independently selectable by the user, and the user has an ability to explore various forms of content and assorted themes via a user interface of the greeting card generation system. In addition and in accordance with at least one embodiment, the theme 400 can include unobtrusive advertising, and can provide a mechanism to draw a person's attention to the greeting card and/or products, or services, advertised in the greeting card, for example.

The theme 400 can identify the portions of a greeting card at which content 412, e.g., user-selected content, advertisement, etc., is to be experienced during the greeting card's presentation. The theme 400 can also identify a point during presentation at which gift 414, and/or hints or other information associated with the gift 414, are to be revealed to the recipient. The stylized presentation 406 can include the personalized message provided by the user during generation of the greeting card, and identify the manner in which the user's personalized message is to be presented as part of the greeting card's presentation.

Content 412 can be a part of the artistic style 402 of the greeting card and/or can be experienced as a part of a product placement or other product integration during the greeting card's presentation, for example. Product integration 404 includes without limitation any type of presentation associated with a product represented in the greeting card. For example, the theme 400 can include a product integration 404 that comprises a representation of a product such as a handheld device that a user typically uses to experience multimedia content, e.g., a Sony PSP®, PlayStation Portable, with the representation appearing to be playing portions of content 412.

In addition, embodiments of the present disclosure provide a mechanism to expose users, e.g., a user that generates the card, a sender, and/or a user that receives the card, a recipient, to advertisements and/or marketing information, which can be integrated seamlessly into the card. For example, advertisers/marketers can use lower third overlays and other elements integral to the presentation to advertise a product, e.g., a product that compliments the content, and/or the gift, associated with the greeting card. By way of yet another non-limiting example, an advertisement can be related in some manner to content experienced via the greeting card, e.g., an advertisement for sun tan lotion presented while a surfing clip is being experienced, or the greeting card's theme, e.g., Coca-Cola® theme for the greeting card, can include an integrated advertisement.

In accordance with one or more embodiments, a coupon can be attached to a greeting card. By way of a non-limiting example, a user can attach a coupon to a greeting card as a gift, e.g., a coupon is attached to a card for three free months at a fitness center or a free drink.

Embodiments of the present disclosure comprise a web site to which the user navigates in order to generate a greeting card. As part of the greeting card generation, the user can be given an opportunity to attach, or otherwise associate, a gift, whether digital or physical, to the greeting card. In accordance with one or more such embodiments, the user can be given one or more gifting alternatives, from which the user can select a gift to be attached to the greeting card. The gifting alternatives can comprise gifts offered by one or more e-commerce entities. In accordance with one or more embodiments, the user remains at the greeting card web site to attach a gift to the greeting card.

In accordance with one or more such embodiments, the greeting card system reminds the sender, e.g., by way of information displayed in one or more web pages provided by the system, about the source of the gift, e.g., the e-commerce entity that offers the gift. Furthermore and in accordance with one or more such embodiments, the sender can be provided with a link to the e-commerce entity so that the sender has an opportunity to review other offerings, e.g., other gifting options, available from the e-commerce entity.

In accordance with one or more such embodiments, as with the sender, the greeting card recipient can be provided with reminders, e.g., reminders of the source of content and/or a gift. As is described in more detail below with reference to FIG. 2, a greeting card recipient can identify a source of the content or gift associated with a greeting card, and can be directed, e.g., via a selectable link within the player, to the source's web site.

As an alternative, one or more embodiments of the present disclosure support a white labeling approach, in which a user can generate a greeting card from another web site, e.g., an e-commerce web site. In accordance with such an embodiment, the user can access the greeting card generation system to generate a greeting card from the e-commerce web site. By way of a non-limiting example, at some stage of a purchase transaction with an e-commerce web site the user can be given an option to send a greeting card in connection with a gift being purchased through the e-commerce web site, or an online or brick-and-mortar merchant.

In accordance with one or more embodiments, content 412 comprises available information, e.g., information that is available in electronic, e.g., digital form, via the Internet, or web, or other network, or any electronic medium, and can comprise multimedia streaming data, audio and/or video data, etc. Examples of categories of content include, but are not limited to: film, television, music, stock footage, news, sports, commercials, travel, user-generated, how-to, animation, gaming, activism, style and fashion, lifestyle and the like. Examples of content include without limitation a clip from a television show, do-it-yourself tutorial, political soundbite, and the like.

In accordance with one or more such embodiments, the greeting card generation system uses pre-existing relationships and arrangements with one or more content providers that permit greeting card users to use such content in a greeting card. Other content that can be used in greeting card generation includes without limitation content supplied by the user, e.g., one or more slides of a family vacation.

Embodiments of the present disclosure contemplate a content production mashup capability to generate new, unique content, which can be offered to greeting card users for inclusion in a greeting card. In accordance with such embodiments, one or more video, or audio, content portions can be "mixed" with one or more otherwise separate and/or unrelated video, or audio, content portions to create content. The production mashup capability can involve content from one or more sources, or content providers. Of course, any such content production would be in keeping with any applicable limitations or restrictions on use of such content.

In accordance with one or more embodiments, the greeting card system can identify content via a periodic search of the web, e.g., using web crawler technology. One or more search engines can be used to provide a set of search results comprising such content in response to a user's search query. Use of such content can be subject to any restrictions, e.g., copyright or other legal restrictions.

Content can be made available from any of a number of content providers. Motion picture studios and television networks are non-limiting examples of content providers. Embodiments of the present disclosure make such content available to users for use in personalizing or customizing a greeting card. For example, using embodiments of the present disclosure, a user can define a card that includes one or more scenes from an old Bogart classic as content for a greeting card; or a greeting card that includes one or more "Three Stooges" clips, or other library clips. Use of library clips can revive interest in classics and stimulate a desire to revisit them, e.g., to obtain full feature versions of the classics based on a viewing of one or more clips. In accordance with at least one embodiment, a user can build a card that includes such clips to be presented to the card's recipient via a player. In accordance with one or more embodiments, the player includes at least one button that provides information about the clip, and can include a mechanism that directs the user to an online point of purchase, so that the recipient can purchase the full version of the content, e.g., a DVD of the movie, television show, etc. By way of non-limiting example, the above-mentioned player can be player 200 described in more detail below with reference to FIG. 2. By way of some non-limiting examples, player 200 can include an informational button 208 to obtain information about the clip, as well as content button 204E to be directed to the content provider's online point of purchase.

Content that is to be offered to a user for selection during greeting card generation can include original content, including mashup content. By way of a non-limiting example, content can be created that is geared specifically to a greeting card, a user, etc. Even though existing and re-purposed content will present users with a multitude of options, content can be generated that focuses current trends and may be more timely and up-to-date than previously-generated content.

In accordance with one or more embodiments, the mashup capability provides the user with an opportunity to use content provided by one source in a greeting card and attach a gift that is offered by a source other than the content source. In accordance with the open system approach used in connection with one or more embodiments of the present disclosure, the sender and/or recipient can be made aware of each source during card generation, in the case of the sender, and during card presentation, in the case of a recipient.

Embodiments of the present disclosure contemplate greeting card generation in connection with a number of models or approaches, including without limitation: free (e.g., ad-supported and/or marketing-supported) and subscription.

Internet users have become accustomed to consuming online content for free. For those who do not wish to spend money, at least one embodiment provides a free service, which offers free cards supported by advertising, marketing or both. That is and by way of a non-limiting example, a free greeting card generation service can be provided, which can be supported with revenue from an advertisement and/or marketing component included with the greeting card. By way of a non-limiting example, a user can be given an ability to create a greeting card that includes some type of advertisement or marketing component. Arrangements with the e-commerce entities, e.g., online merchant(s), can define details with respect to advertisement revenue, etc. Such arrangements can include without limitation, a basis for determining the revenue generated, e.g., revenue based on cost per number of impressions, cost per click, cost per acquisition, etc.

By way of a non-limiting example, advertisements can be immersed as part of the greeting card experience, e.g., while the user is generating the greeting card and in the greeting card itself, so as to maximize efficiency and reach. Advantageously, ad immersion can become a part of the greeting card presentation rather than an interruption of the user experience. Embodiments of the present disclosure contemplate use of advertisements such as, without limitation, overlay ads relevant to a content, gift and theme of a given card. In addition to overlay ads, greeting cards can integrate inventive advertising mechanisms within the theme and content interface that will effectively bridge the gap between consumer and advertiser and increase interactivity.

By way of another non-limiting example, a marketing-supported approach that can be used to build public awareness of a product or property, might involve a media company that offers content, e.g., a movie trailer, clip from an episode of a show, for selection by a user for inclusion in a greeting card. The user is exposed to the content during greeting card generation, and each greeting card recipient is exposed to the content during the greeting card presentation. Greeting card themes can also be used to provide a marketing ad space. Users are able to use the site for free and have access to such content, and the content can be added to a greeting card so that it can be viewed by an audience, e.g., the greeting card sender and/or recipient. In accordance with one or more such embodiments, a gift, e.g., a gift relevant to the property being marketed, can be associated with a greeting card.

In accordance with such ad/marketing-supported embodiments, an entity, e.g., manufacturer, service provider, entertainment company, media company, studio, network, record company, etc., has an opportunity to distribute advertisement or marketing/promotional content using a familiar custom of greeting, in the form of a greeting card. Such content can be distributed by the users themselves, in a way that is consistent with their own personal and social narratives.

In accordance with other embodiments of the present disclosure, the greeting card generation system is provided to users via a subscription model, in which users pay a subscription fee to use the greeting card generation system. In accordance with one or more alternate embodiments, a user can elect to generate an ad-free greeting card using the subscription service provided by the greeting card generation system. Revenue can be generated through such subscriptions. The subscription model can provide a different experience level for the subscription user in comparison to that provided to the non-subscription user. For example, the subscription user can be given access to premium greeting cards free of advertising, and/or access to exclusive and/or high definition content. The subscription service may also provide additional features over those provided with a non-subscription service, e.g., unique promotions and gifting discounts.

Embodiments of the present disclosure provide access to the greeting card generation system via a web site that comprises one or more web pages that make a user interface of the greeting card generation system available to the user.

The greeting card generation system can be made available at any point at which a user has a desire to generate a card. For example and in connection with one white labeling approach, a user may find content that the user considers to be ideal for a greeting card while surfing a web site that presents video content to the user, e.g., YouTube. Embodiments of the present disclosure allow the user to invoke the greeting card generation system at such a point, while surfing the web, so that the user has the ability to generate an impromptu greeting card.

For example and in connection with another white-labeling approach used in connection with one or more embodiments, the greeting card generation system can be made available to the user from a web site at which the user purchased a gift. In accordance with one or more such embodiments, a user is provided with an ability to create a greeting card during, or in connection with, a checkout process of an e-commerce site, online merchant, etc. For example, a user can be presented with an opportunity to add a greeting card during, e.g., toward the completion, of a purchase transaction, to add a greeting card to the purchase. Embodiments contemplate integration of a greeting card generation system with an online site or retail location to enhance a user's experience.

In addition to white labeling and as is discussed herein, a user can also access the greeting card generation system directly, e.g., by accessing the greeting card generation web site.

Embodiments of the present disclosure are applicable in both domestic and foreign markets. Although gifting preferences may differ from one country to the next, use of a greeting card for greeting is considered to be universal. Embodiments of the present disclosure can establish preferences, such as greeting card and content preferences, which can differ among markets, territories, countries, etc.

One or more embodiments of the present disclosure include an ability to notify users of new content, gifts and themes available to the user to generate a greeting card, e.g., via a newsletter that can be subscribed to by the users. In accordance with one or more such embodiments, content owners and e-retailers may compete to gain a spot in the newsletter, given the promotional advantage it affords and ability to directly connect with the greeting card generation user base.

Embodiments of the present disclosure collect data, and mine the data collected, e.g., to gain knowledge from the historical data, make predictions to increase revenue and/or cut costs and/or to provide decision support. Data mining and analysis can be used to identify the goods to be promoted to the customer/user, a probability that a user will respond to a planned promotion, predict peak network loads, identification of producers of defective goods, as some non-limiting examples.

Data that can be collected in accordance with embodiments can differ based on the industry/company, and can include without limitation, sales and contacts history, viewing patterns, number of hits, surfing patterns, demographic information, click stream and transactional data. Data can be used to, for example and without limitation, identify users considered to be the best prospects and retain them as customers, predict cross-selling opportunities and make recommendations, learn parameters that influence trends in sales and margins, and segment markets and personalize communications.

Examples of types of data that can be collected include without limitation data collected from a transaction, data purchased from a data collection entity, and other data collection, e.g., data collected from user surveys. Transaction data can be used to identify a customer's past behavior, e.g., what the customer has actually done. Such information can be used as a predictor of future behavior. Transaction data can include without limitation prior purchases or donations, web page visitations, length of stay at a particular web page. Purchased data can include without limitation demographic and psychographic data. Collected data adds information about a customer's attitudes and opinions, including without limitation customer satisfaction levels, customer preferences, purchase intentions, share-of-wallet information, etc.

As part of greeting card generation, embodiments of the present disclosure contemplate offering an array of pre-packaged greeting cards, so as to accommodate users that are not interested in customizing their own cards. In addition, embodiments provide an interactive interface to allow a user to generate, and personalize, a greeting card. In accordance with at least one embodiment, the interactive interface is offered as a series of web pages displayable by a browser software application running on a user computer.

In accordance with one or more embodiments, the user interface includes without limitation stages that allow the user to independently select a theme, personalize a message, select content and optionally select a gift for the greeting card. The stages of the interface can be performed in any order. FIG. 1 provides an example of an interface that can be used to generate a greeting card in accordance with one or more embodiments of the present disclosure.

The interface provided in accordance with one or more embodiments includes an interface to enable the user to design and review the greeting card as it is being designed.

The interface 100 includes tabs 102 that allow the user to navigate freely among the theme selection, personalization, content selection and gift selection stages. The user can view selection options, e.g., themes, content and gift selections in window 112. Selections made available via window 112 correspond to whichever tab 102 is currently selected. For example, the user can view available theme selections by selecting tab 102A. The user can add a personalized message, e.g., a predefined message, or input an ad hoc message for the greeting card under the personalize tab 102B. Available content, which can include user-generated content, can be viewed and a content selection can be made by selecting tab 102C. The user can attach a gift to the greeting card under tab 102D.

In the example interface shown in FIG. 1, the user is also given options to navigate to a home page using the home selection 106A, to a previous web page using the back selection 106B, and to a next web page using the next selection 106C. The user can view the greeting card, or portions of the greeting card selected via icons 104 in view window 110.

As discussed herein, embodiments of the present disclosure contemplate any of a number of delivery mechanisms for a greeting card, including without limitations, email and online platforms, instant messaging, etc. to any of a number of user devices, including, personal computer, portable devices, including mp3 players, cellular phones, smart phones, etc.

Figure 2:
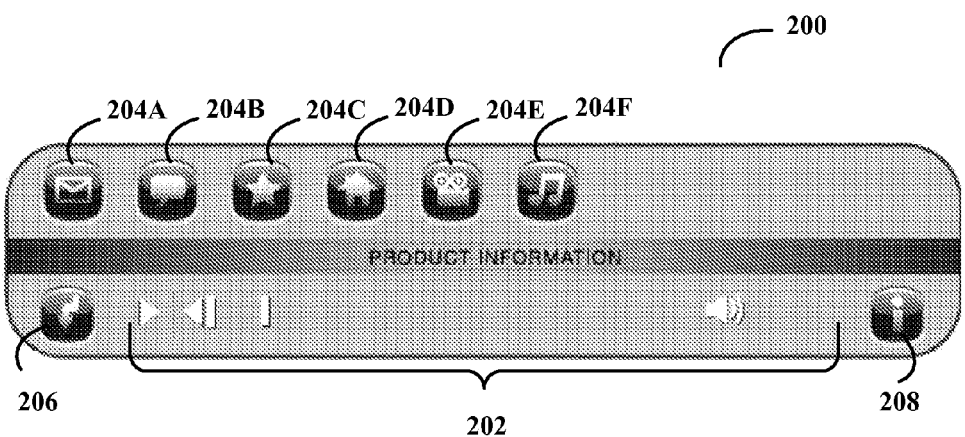
FIG. 2 provides an example of a player interface to view a greeting card in accordance with one or more embodiments of the present disclosure.

In accordance with one or more embodiments, a player can be used by a greeting card recipient such as the one shown in FIG. 2. As is discussed in more detail in connection with FIG. 3, player 200 provides a mechanism to direct the greeting card recipient back to content and e-commerce entities corresponding to the content and gift selections made by the sender of the greeting card during greeting card generation.

Referring to FIG. 2, player 200 can be selected while the user is viewing a greeting card. Player 200 includes buttons 202 that provide playback functionality, e.g., audio playback, video playback, or both. Such functionality can include without limitation play, forward, reverse, volume, etc.

Icons 204 provide other functionality associated with a greeting card in accordance with one or more embodiments of the present disclosure. Gift delivery icon 204D can be used with a gift that is to be physically delivered, e.g., a camera. The user selects icon 204D to provide the necessary delivery information, e.g., shipping name and address.

Music icon 204F can be used in a case that the greeting card includes audio content, e.g., music track, to direct the user to a destination at which the user can purchase the content, and to identify the audio content. Similarly, the content icon 204E can direct the user to a destination at which the user can purchase video content, and to identify the video content. By way of a non-limiting example, the greeting card can include a clip from a Bogart movie, which entices the user to want the full feature film. The user can select the content icon 204E to access a site at which the user can purchase the movie. A "fun stuff" icon 204C provides access to other products, e.g., products that compliment the greeting card. For instance, the icon 204C can be used to purchase a pair of shoes that are worn by an individual in a video clip that is viewable via the content icon 204E. Other examples of products accessible via the "fun stuff" icon 204C include without limitation, merchandise such as T-shirts, bobble heads, other movies, etc.

Icon 204A allows the user to open an email message to send the greeting card to another recipient. Icon 204B allows the user to input a comment, e.g., a comment on the greeting card, or input survey information.

Download icon 206 allows the user to download a downloadable gift or other downloadable attachment to the greeting card, if and when such downloadable component is attached to the card. Information icon 208 can be used to obtain information about something in the greeting card. For example, in an ad-supported greeting card, icon 208 can be used to find out more about the sponsor or a product advertised or highlighted via the greeting card.

Figure 3A:
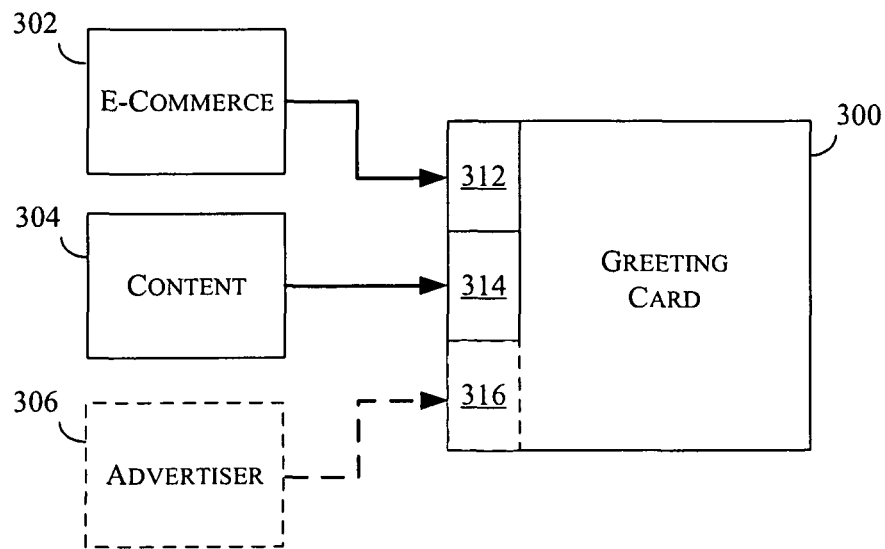
FIG. 3 illustrates a bidirectional aspect of a greeting card system in accordance with one or more embodiments of the present disclosure.

FIG. 3 illustrates a bidirectional aspect of the greeting card system in accordance with one or more embodiments of the present disclosure. FIG. 3A illustrates a view from the perspective of a sender. The sender uses the greeting card generation system to generate greeting card 300, e.g., by selecting a theme, content, personalized message, and gift using interface 100 of FIG. 1. The generated greeting card comprises an e-commerce component 312 corresponding to one or more e-commerce entities 302, and a content 314 that corresponds to one or more content sources/providers 304. In accordance with one or more embodiments and in a case that an ad-supported or marketing-supported model is used to generate the greeting card 300, greeting card 300 can include an advertisement, or marketing, component 316, corresponding to one or more advertisers/marketing entities.

Figure 3B:
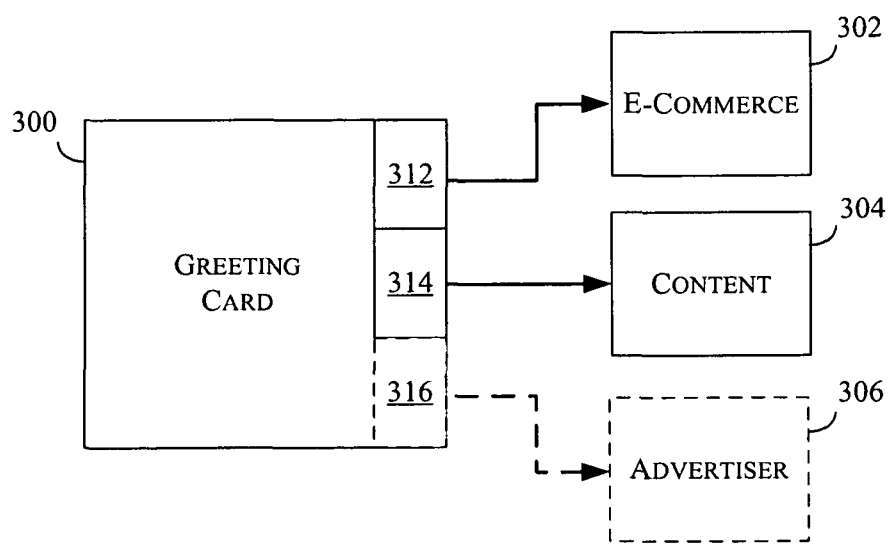

FIG. 3B provides a view from the perspective of a recipient of the greeting card. The greeting card 300 presented to the recipient includes the e-commerce component 312, content component 314 and optionally the advertisement component 316 (in a case of a ad/marketing-supported generation model). Using a player, e.g., player 200, the user can access components 312, 314, 316 of the greeting card 300, which direct the recipient to the original e-commerce, content and advertiser/marketing 302, 304, and 306 (respectively) identified during generation of the greeting card.

By way of a non-limiting example, icon 204F of player 200 can direct the recipient to a destination, e.g., a provider of the content 304 corresponding to the content component 314 of the greeting card 300 selected by the sender for inclusion in the greeting card 300 using the greeting card generation system and the user interface shown in FIG. 1. By way of another non-limiting example, icon 204C can be used to direct the recipient to a web site associated with an e-commerce entity 302, such as an e-commerce entity that sells a pair of shoes worn by an individual in a video clip portion of content 304 that is viewable via the content icon 204E of player 200 so that the user can find out more information about the shoes and possibly purchase the shoes. By way of yet another non-limiting example and in connection with an ad-supported generation model, icon 208 of player 200 provides access by the recipient to information about an advertised product.

Embodiments of the present disclosure include a smart technology aspect. The smart technology can comprise a personal assistant that couples a sender's address book and/or calendar to allow the sender to set reminders, and receive notification, before a calendared event, e.g., a birthday, anniversary, or other event. A notification can serve as a prompt for the user to access the greeting card generation system to generate a card for the occasion identified in the notification.

Another example of smart technology involves a recommender, or recommendation system. A sender can be given content suggestions based on prior gift selections, or vice versa. A social recommender can provide the sender with recommendations based on selections made by other users. By way of a non-limiting example, the sender can be provided with content selection alternatives identified based on the content selected by other users that purchased the gift that the sender purchased. The smart technology can integrate analytics to suggest gifts based on a sender profile and/or recipient profile, which profile can include historical information, preferences, demographic information, for example. A recommender can suggest content, gifts or themes considered to be similar or relevant to content, gifts or themes "browsed" by users.

As yet another example of smart technology that can be used, a gift/content wiki provides functionality to showcase unique and creative gift/content combinations and obtain user comments/votes on the showcased items. The comments and/or votes can be integrated into the greeting card generation system and highlighted in a user newsletter, for example.

Smart profiles provide another example of smart technology, and allow a user to personalize their profile settings to remember important dates, provide a reminder/notification of specific/important dates. Users can be notified when their friends send cards to shared peers within a social network. Users can be provided with an ability to create a wish list, which can be seen by other users. Users can have the ability to control whether or not other users are permitted to browse their gift and/or card history and wish lists. Demographic information can be maintained, and can be made available, to friends and family.

Smart technology can provide a mechanism to import information from one or more applications, such as address book or contact information, calendar information, into the greeting card generation system. In addition, a mechanism can be provided to verify and/or synchronize such information.

The following provides examples of greeting cards contemplated for generation using a greeting card generation engine in accordance with one or more embodiments.

A clip mix greeting card includes a greeting card in which a user can create playlists of content, e.g., video content, such as a playlist of content that relate to a common theme. For example, a user can choose clips of content and integrate the selected clips together as a video mix to be sent as part of a greeting card to one or more recipients.

A charity, or non-profit card is one in which the gift comprises a donation that is directed to a charity or non-profit organization. An e-commerce site can be used to offer goods to a charity or non-profit organization. The consumer can be presented with various levels of donations that equate to the caliber of the gift that can be sent, for example.

A greeting card can comprise an invitation. By way of a non-limiting example, the user can be presented with themes and content to integrate into the greeting card, and the greeting card can include a gift registry or gift wish list. A fortune cookie greeting card can randomly generate a message or fortune. A gift element of the card can correlate with the fortune. For example, the fortune says, "A vacation is in the stars for you", with a gift being five hundred travel miles to be applied to a flight.

A riddle greeting card can comprise a card having content in a form of a puzzle, riddle or game. The gift is revealed once the puzzle, e.g., arcade game, chess, tic-tac-toe, etc. is solved. A dating card can integrate a dating site into a greeting card. A greeting card can include a survey element, to obtain feedback from a user or card recipient. For example, a survey element can be attached to a card, and the user/recipient can be enticed to supply an answer to the survey with a potential to receive something in exchange for their time in completing a survey.

High end invitations can be generated for high-event business, which can include without limitation broadcast quality interactive cards that would not only inform and entertain but also retrieve valuable information from the guest. Greeting cards can be used as invitations to real estate open houses. For example, such a greeting card can include a fully interactive card with a personal video tour of the property and its surrounding areas. A Webcam invite cards can be used to set up a time for a live web cam session where users that are separated by long distances can reconnect with loved ones.

In accordance with one or more embodiments, locations can be established at which users can digitize and edit content, and/or users can drop off audio, video, still images to be organized and assembled into digital photo books, slideshows, libraries and movies, etc. that could then be used in generating a greeting card.

In accordance with one or more embodiments, a theme tool box provides a suite of tools made available to the user to allow the user to create or customize a theme. User-generated themes can be shared using a shareware model, such that a user is able to showcase and share such themes and be paid royalties if the user's theme is used in a greeting card.

Physical locations, e.g., kiosks, can be placed in high traffic areas such as malls where users will be able to generate a greeting card. A gift/content wiki can be provided at a greeting card generation site that allows users to comment and/or vote on showcased gifts/content. A series of greeting cards can be generated and sent to a recipient such that the card recipient is given a gag gift eventually followed by the actual gift. A random gift selection can be provided as a feature with which a sender is prompted to choose a dollar amount and a couple characteristics about the person receiving the card. Based on the dollar amount and traits, several gifting possibilities will be generated giving the receiver options to choose from. A gag gift might be added among the choices.

In accordance with one or more embodiments of the present disclosure, greeting cards can provide a linear experience, e.g., the greeting card is presented in a linear manner from a starting point to an ending point. In accordance with one or more embodiments disclosed herein, a linear greeting card can be customized by the sender, e.g., the sender can provide theme, personalized message, content and gift selections/input.

In accordance with one or more alternate embodiments, a greeting card can provide a non-linear interactive experience. Within the paths inherent in such a non-linear interactive greeting card, there exist possibilities of personalization, customizable content, customizable gift and/or gift registry, as well as places for advertisement, marketing, product integration and/or corporate sponsorship. During creation of such a card, the sender can be presented with an opportunity to personalize and customize various portions of the card experience. Upon receipt of an interactive card, the recipient is able to select from multiple paths in order to experience the environment personalized by the sender. The recipient is able to choose certain portions of the greeting card before other portions, thereby allowing the recipient to experience the interactive card in a non-linear manner.

Thus and in accordance with one or more such embodiments, presentation of a greeting card can be an interactive experience that is to some degree controllable by the recipient. By way of a non-limiting example, the greeting card can provide a personalized thematic website filled with content, information and gift(s), which the recipient can browse and select. An interactive greeting card can present the recipient with an initial display that presents the recipient with multiple paths that can be selected by the recipient. The recipient interacts with the greeting card by selecting one or more of the paths. Selection of one path can result in one experience for the recipient, while selection of another path can result in a different experience. Furthermore, selection of a given path can result in additional selections being made available to the recipient.

By way of a non-limiting example, a sender can create an interactive invitation greeting card that incorporates themes of a favorite television show, such as an interactive greeting card with a Sponge Bob related theme and/or design. During creation of such a card, the sender can be presented with an opportunity to personalize and customize various portions of the card experience. Such portions of the card can include without limitation elements of Sponge Bob's home environment where the user can create a personalized invitation, a gift registry, choose from among several different Sponge Bob marketing opportunities, and upload personal user-generated content which can be related to the invitation or theme of the interactive experience in general. Upon receipt of the Sponge Bob interactive card, the recipient is able to select from the multiple paths as personalized by the sender, and experience the card in a non-linear manner. As a non-linear experience, the recipient can choose to view certain portions of the experience before others, such as the gift registry first followed by the user-generated content, the recipient can choose to experience the marketing slot before the gifting or personalized message, etc.

The following a description of a general-purpose computer environment that may be utilized to implement various portions of the invention. Such general-purpose computer can comprise a personal computer, a server, a handheld device, appliance, etc.

Embodiment of General Purpose Computer Environment

Figure 5:
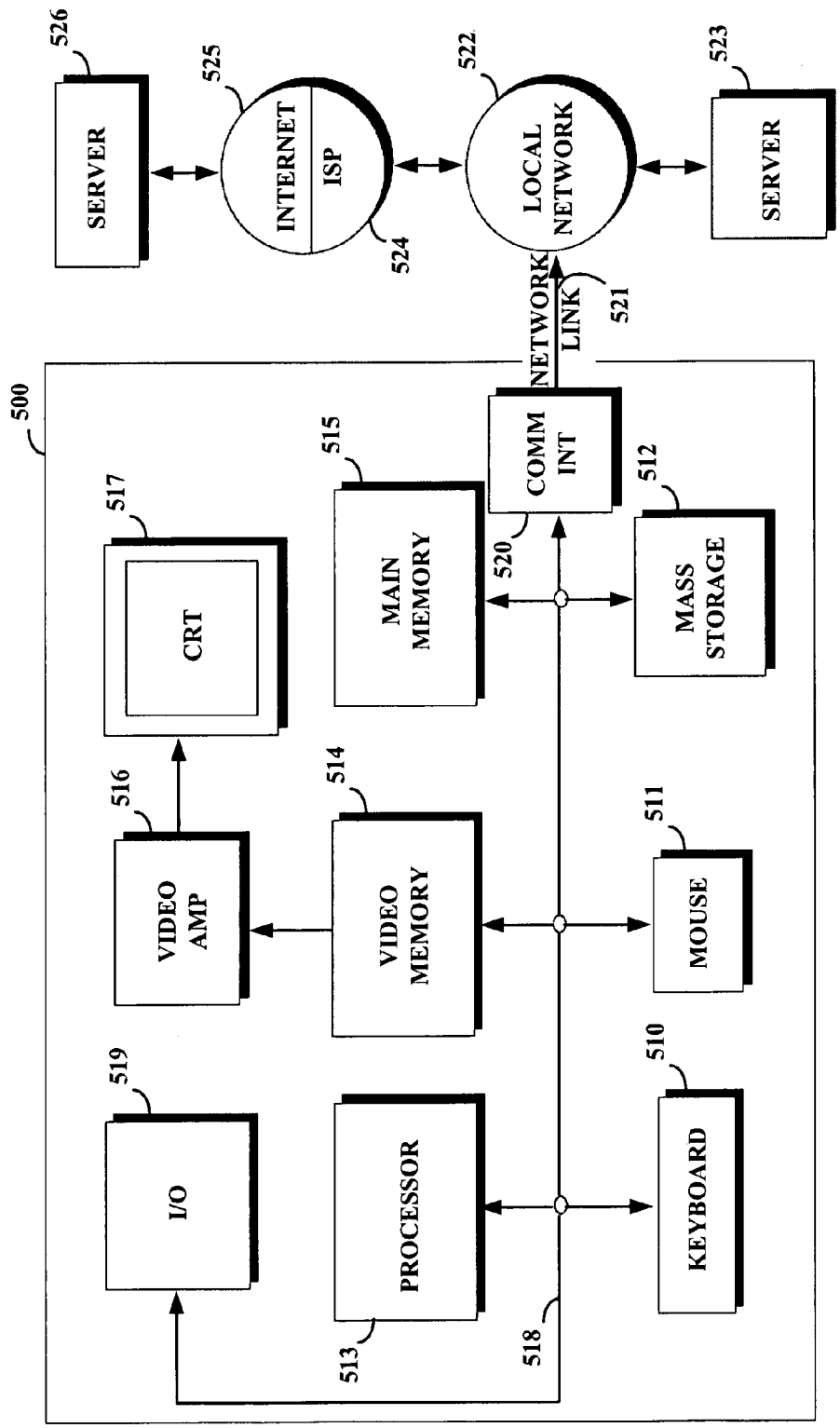

An embodiment of the invention can be implemented as computer software in the form of computer readable program code executed on one or more general-purpose computers such as the computer 500 illustrated in FIG. 5. A keyboard 510 and mouse 511 are coupled to a bi-directional system bus 518 (e.g., PCI, ISA or other similar architecture). The keyboard and mouse are for introducing user input to the computer system and communicating that user input to central processing unit (CPU) 513. Other suitable input devices may be used in addition to, or in place of, the mouse 511 and keyboard 510. I/O (input/output) unit 519 coupled to bi-directional system bus 518 represents possible output devices such as a printer or an A/V (audio/video) device.

Computer 500 includes video memory 514, main memory 515, mass storage 512, and communication interface 520. All these devices are coupled to a bi-directional system bus 518 along with keyboard 510, mouse 511 and CPU 513. The mass storage 512 may include fixed and/or removable media, such as magnetic, optical or magnetic optical storage systems or any other available mass storage technology. The system bus 518 provides a means for addressing video memory 514 or main memory 515. The system bus 518 also provides a mechanism for the CPU to transfer data between and among the components, such as main memory 515, video memory 514 and mass storage 512.

In one embodiment of the invention, the CPU 513 is a microprocessor manufactured by Motorola, such as the 680X0 processor, an Intel processor, and the like. However, any other suitable processor or computer now known or later developed may be utilized. Video memory 514 is a dual ported video random access memory. One port of the video memory 514 is coupled to video accelerator 516. The video accelerator device 516 is used to drive a CRT (cathode ray tube), and LCD (Liquid Crystal Display), or TFT (Thin-Film Transistor) monitor 517. The video accelerator 516 is well known in the art and may be implemented by any suitable apparatus. This circuitry converts pixel data stored in video memory 514 to a signal suitable for use by monitor 517. The monitor 517 is a type of monitor suitable for displaying graphic images.

The computer 500 may also include a communication interface 520 coupled to the system bus 518. The communication interface 520 provides a two-way data communication coupling via a network link 521 to a network 522. For example, if the communication interface 520 is a modem, the communication interface 520 provides a data communication connection to a corresponding type of telephone line, which comprises part of a network link 521. If the communication interface 520 is a Network Interface Card (NIC), communication interface 520 provides a data communication connection via a network link 521 to a compatible network. Physical network links can include Ethernet, wireless, fiber optic, and cable television type links. In any such implementation, communication interface 520 sends and receives electrical, electromagnetic or optical signals which carry digital data streams representing various types of information.

The network link 521 typically provides data communication through one or more networks to other data devices. For example, network link 521 may provide a connection through local network 522 to a host computer 523 or to data equipment operated by an Internet Service Provider (ISP) 524. ISP 524 in turn provides data communication services through the worldwide packet data communication network now commonly referred to as the Internet 525. Local network 522 and Internet 525 both use electrical, electromagnetic or optical signals that carry digital data streams to files. The signals through the various networks and the signals on network link 521 and through communication interface 520, which carry the digital data to and from computer 500, are exemplary forms of carrier waves for transporting the digital information.

The computer 500 can send messages and receive data, including program code, through the network(s), network link 521, and communication interface 520. In the Internet example, server 526 might transmit a requested code for an application program through Internet 525, ISP 524, local network 522 and communication interface 520.

In one embodiment of the invention a thin-client device is configured to interface with the computer system described above via a computer network. In other instances (e.g., when a smart mobile device is utilized) some or all of the components discussed above are incorporated into the device. It will be evident to one of ordinary skill in the art that the computer systems described above are for purposes of example only. An embodiment of the invention may be implemented in any type of computer system or programming or processing environment.

For the purposes of this disclosure a computer readable medium stores computer data, which data can include computer program code executable by a computer, in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Thus, a method and apparatus for generating a greeting card has been described. Particular embodiments described herein are illustrative only and should not limit the present invention thereby. The claims and their full scope of equivalents define the invention.

What is claimed is:

1. A method to facilitate an interaction platform for generating themed based interactive greeting card comprising:
   A. connecting a host computer system to a network, wherein said host computer provides a platform for one or more product recommendation provider;
   B. providing, by said one or more product recommendation provider, one or more product recommendation via said platform to one or more product recommendation receiver;
   C. sending, by said one or more product recommendation provider, an electronic greeting card via said platform to said product recommendation receiver;
   D. including, by said one or more product recommendation provider, said one or more product recommendation in said electronic greeting card wherein said product recommendation is a gift;
   E. including, by said one or more product recommendation provider, a content to said electronic greeting card, wherein said content is provided by third-party content providers in said platform, wherein said content providers permit said content to be used only in connection to said electronic greeting card via said platform, wherein said content is a video clip; and
   F. generating said electronic greeting card, wherein said electronic greeting card comprises a theme wherein said theme comprises a product integration wherein said product integration comprises a representation of a handheld device for experiencing multimedia content with said handheld device appearing to be playing said content wherein said gift is relevant to said theme and said content.

2. The method of claim 1 wherein said handheld device is a PlayStation Portable.

\* \* \* \* \*